United States Patent
Rutan et al.

(10) Patent No.: US 6,434,391 B1
(45) Date of Patent: Aug. 13, 2002

(54) METHOD AND APPARATUS FOR CHANNEL PATTERN BASED MANAGING INBOUND TRAFFIC IN A TWO-WAY WIRELESS MESSAGING SYSTEM

(75) Inventors: Deborah Lynn Rutan, Saginaw; Slim Souissi, Fort Worth; Jheroen Pieter Dorenbosch, Paradise, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/275,658

(22) Filed: Mar. 24, 1999

(51) Int. Cl.[7] .................................................. H04Q 7/20
(52) U.S. Cl. ....................... 455/452; 455/450; 455/518; 340/7.21; 340/7.24
(58) Field of Search ................................ 455/450, 452, 455/509, 518, 519; 379/106.1, 106.3; 340/7.21, 7.1, 7.29, 7.24

(56) References Cited

U.S. PATENT DOCUMENTS

| | | | | |
|---|---|---|---|---|
| 5,214,789 A | * | 5/1993 | George ....................... 455/33.2 |
| 5,761,621 A | * | 6/1998 | Sainton ....................... 455/453 |
| 5,805,978 A | * | 9/1998 | Souissi et al. ............. 455/31.3 |
| 5,825,811 A | * | 10/1998 | Souissi ....................... 455/509 |
| 5,845,213 A | * | 12/1998 | Summer et al. ............ 455/458 |
| 5,974,034 A | * | 10/1999 | Chin et al. ................. 455/31.3 |
| 5,974,300 A | * | 10/1999 | LaPorta et al. ............. 455/426 |
| 6,128,472 A | * | 10/2000 | Harel et al. ................. 455/502 |

\* cited by examiner

*Primary Examiner*—Edward F. Urban
*Assistant Examiner*—Marceau Milord
(74) *Attorney, Agent, or Firm*—R. Louis Breeden; Matthew C. Lopp
 now

(57) ABSTRACT

A controller (112) defines (402) a channel pattern specifying a network destination for inbound channel traffic, a subscriber unit address group to which the channel pattern applies, and a predetermined time interval during which the channel pattern is to be active. The controller transmits (406) the channel pattern to a processor (310) which processes received inbound traffic. The processor then manages (412) the inbound traffic in accordance with the channel pattern.

18 Claims, 3 Drawing Sheets

METHOD AND APPARATUS FOR CHANNEL PATTERN BASED MANAGING INBOUND TRAFFIC IN A TWO-WAY WIRELESS MESSAGING SYSTEM

FIELD OF THE INVENTION

This invention relates in general to wireless communication systems, and more specifically to a method and apparatus for managing inbound traffic in a two-way wireless messaging system.

BACKGROUND OF THE INVENTION

Two-way messaging systems allow portable subscriber units to receive outbound messages from the fixed portion of the system and to send inbound messages to the fixed portion. Some of the inbound messages are "scheduled", i.e., their time of transmission is known to the fixed portion. An inbound message becomes scheduled either by a request from the fixed portion or by originating from a messaging unit programmed to transmit only at specific times, e.g., telemetry reporting devices. Short, subscriber-initiated messages are not scheduled, but are sent using an ALOHA technique designed to minimize collisions.

A need has arisen for sharing some portions of two-way messaging systems. For example, the owner of a system may want to lease time on the system to several different service providers, each having their own, private customer database, telephone access, and accounting systems. Another example that suggests system sharing could be an electric company that wants to put meter-reading units on the system and have periodic readings sent to the electric company's server. Prior art messaging systems have not easily lent themselves to these types of shared operation—particularly with regard to inbound messages, which typically have been routed to a single control point in the system.

Thus, what is needed is method and apparatus in a two-way wireless messaging system for managing inbound traffic. In particular, facilities are needed to support shared use of the system.

SUMMARY OF THE INVENTION

An aspect of the present invention is a method in a two-way wireless messaging system for managing inbound traffic. The method comprises the step of defining a channel pattern specifying a network destination for inbound channel traffic, a subscriber unit address group to which the channel pattern applies, and a predetermined time interval during which the channel pattern is to be active. The method further comprises the steps of transmitting the channel pattern from the wireless messaging system to a processor which processes received inbound traffic; and managing, by the processing system, the inbound traffic in accordance with the channel pattern.

Another aspect of the present invention is a controller in a two-way wireless messaging system for managing inbound traffic. The controller comprises a network interface for receiving a message, a processing system coupled to the network interface for processing the message, and a base station interface coupled to the processing system for controlling and communicating with a base transmitter and a base receiver. The processing system is programmed to define a channel pattern specifying a network destination for inbound channel traffic, a subscriber unit address group to which the channel pattern applies, and a predetermined time interval during which the channel pattern is to be active. The processing system is further programmed to transmit the channel pattern through the base station interface to a processor of the base receiver.

Another aspect of the present invention is a base receiver in a two-way wireless messaging system for managing inbound traffic. The base receiver comprises a receiver element for receiving the inbound traffic, a processor coupled to the receiver element for processing the inbound traffic, and a network interface coupled to the processor for communicating with a controller through a network. The processor is programmed to receive through the network interface a channel pattern specifying a network destination for inbound channel traffic, a subscriber unit address group to which the channel pattern applies, and a predetermined time interval during which the channel pattern is to be active. The processor is further programmed to manage the inbound traffic in accordance with the channel pattern.

DETAILED DESCRIPTION OF THE DRAWINGS

Figure 1:
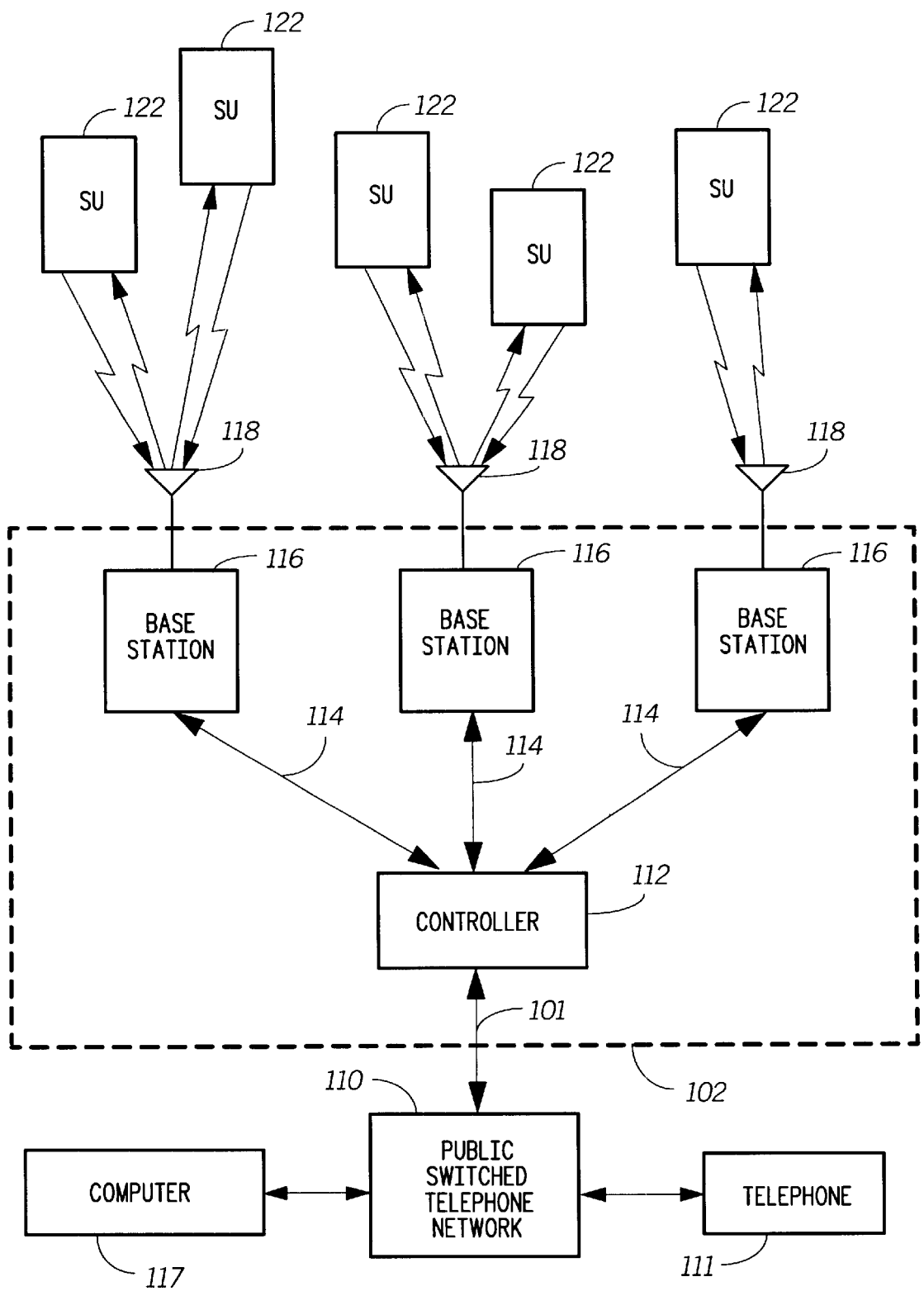
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc., and utilizes software modified in accordance with the present invention. The hardware of the base stations 116 is preferably a combination of the RF-Orchestra!™ transmitter and the RF-Audience!® receiver manufactured by Motorola, Inc. and utilizes software modified in accordance with the present invention. The subscriber units 122 are preferably similar to PageWriter® 2000 data subscriber units, also manufactured by Motorola, Inc. It will be appreciated that other similar hardware can be used as well for the controller 112, the base stations 116, and the subscriber units 122. It will also be appreciated that the various devices forming the controller 112 are not necessarily collocated, but can be distributed.

Each of the base stations 116 transmits RF signals to the subscriber units 122 via an antenna 118. The base stations 116 preferably each receive RF signals from the plurality of subscriber units 122 via the antenna 118. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs), long inbound messages, and negative acknowledgments (NAKs); and unscheduled messages, such as registration requests and requests for items of information. It will be appreciated that, alternatively, the base station 116 can utilize more than a single antenna.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), satellite constellations, and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
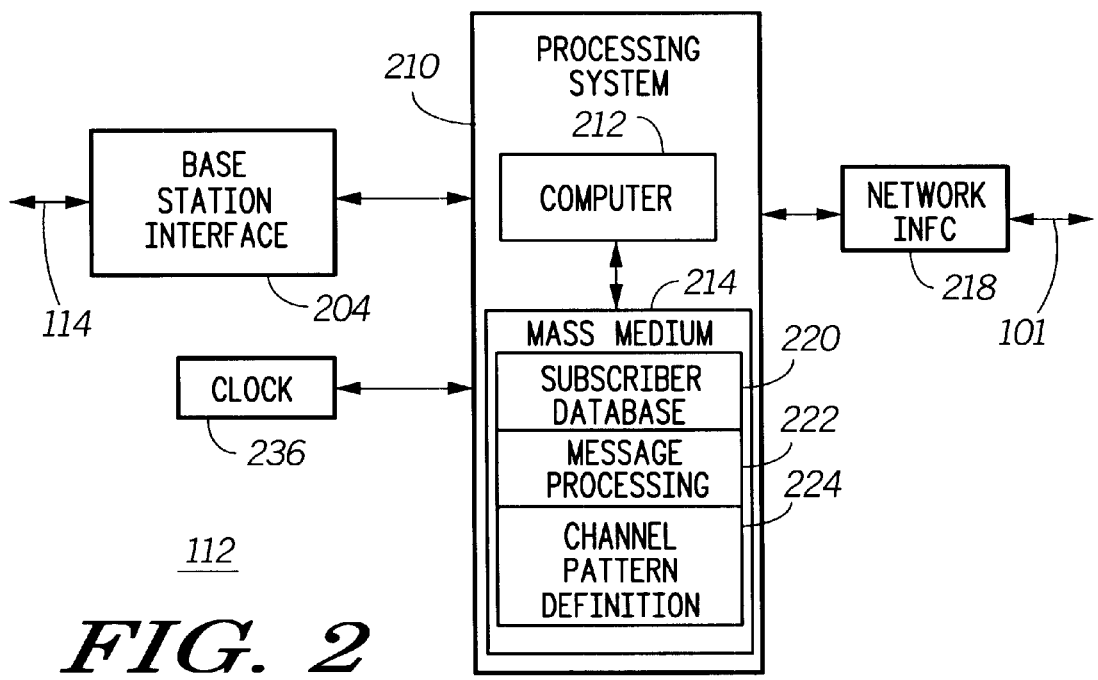
FIG. 2 is an electrical block diagram of an exemplary base receiver in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for controlling and communicating with the network interface 218. The processing system is coupled to a base station interface 204 for controlling and communicating with the base stations 116 via the communication links 114. The processing system 210 is also coupled to a conventional clock 236 for providing a timing signal to the processing system 210. Preferably, the clock 236 is a conventional Global Positioning Satellite (GPS) receiver utilized for synchronizing the controller 112 with other devices in the wireless messaging system. The processing system 210 comprises a conventional computer 212 and a conventional mass medium 214, e.g., a magnetic disk drive, programmed with information and operating software in accordance with the present invention. The mass medium 214 comprises a conventional subscriber database 220 for storing profiles defining service for subscribers using the system. The mass medium 214 further comprises a message processing element 222 for processing messages through well-known techniques.

The mass medium 214 also includes a channel pattern definition program 224 for programming the processing system 210 to define a plurality of channel patterns and transmit them to a processor of the base receiver 300 (FIG. 3) which processes received inbound traffic. Operation of the controller 112 in accordance with the present invention will be described further below.

Figure 3:
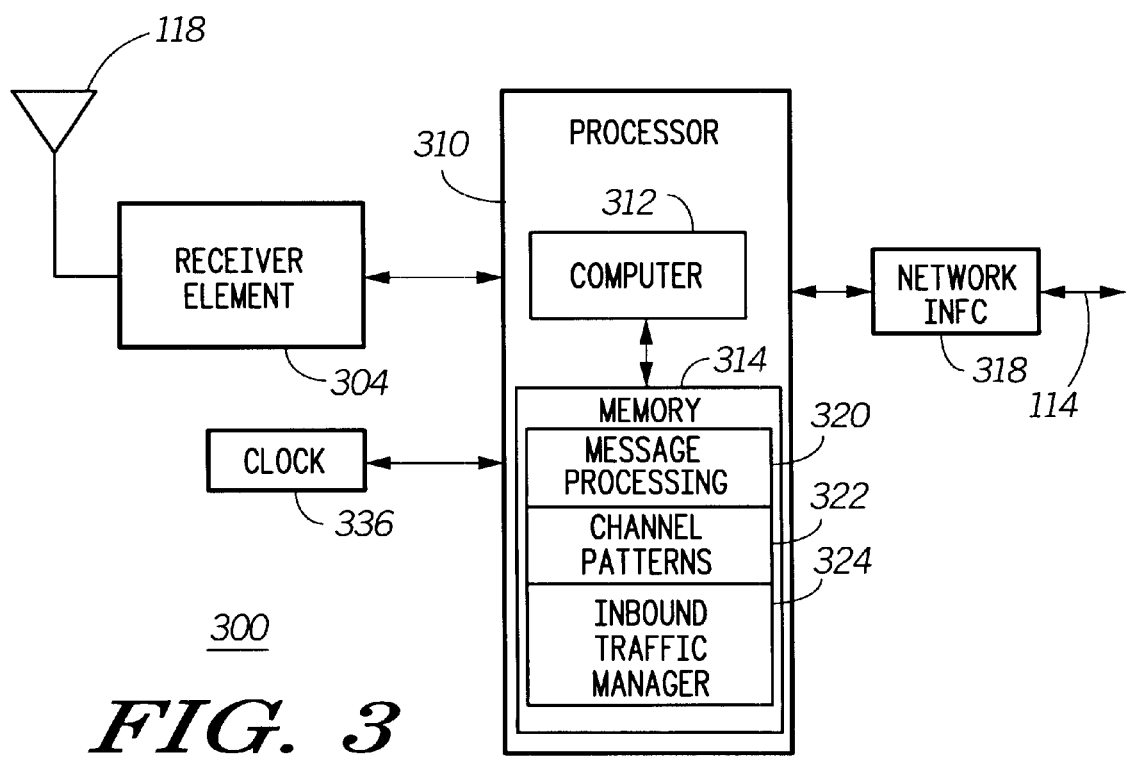
FIG. 3 is an electrical block diagram of an exemplary controller in accordance with the present invention.

FIG. 3 is an electrical block diagram of an exemplary base receiver 300 in accordance with the present invention. The base receiver 300 comprises a network interface 318 for receiving a message from a message originator via the telephone links 101. It will be appreciated that the telephone links 101 can comprise satellite and other wireless links as well as wireline links. The network interface 318 is coupled to a processor 310 for controlling and communicating with the network interface 218. The processor 310 is coupled to a receiver element 304 for receiving inbound messages from the subscriber units 122. The processor 310 is also coupled to a conventional clock 336 for providing a timing signal to the processor 310. Preferably, the clock 336 is a conventional Global Positioning Satellite (GPS) receiver utilized for synchronizing the base receiver 300 with other devices in the wireless messaging system. The processor 310 comprises a conventional computer 312 and a conventional memory 314, e.g., DRAM, FLASH, and EEPROM, programmed with information and operating software in accordance with the present invention. The memory 314 comprises a message processing element 320 for processing messages through well-known techniques. The memory 314 also includes a space for storing channel patterns 322 received from the controller 112. In addition, the memory 314 includes an inbound traffic manager program for programming the processor 310 to manage the inbound traffic in accordance with the channel patterns 322. It will be appreciated that, alternatively, the base receiver 300 can utilize more than one network interface 318.

Figure 4:
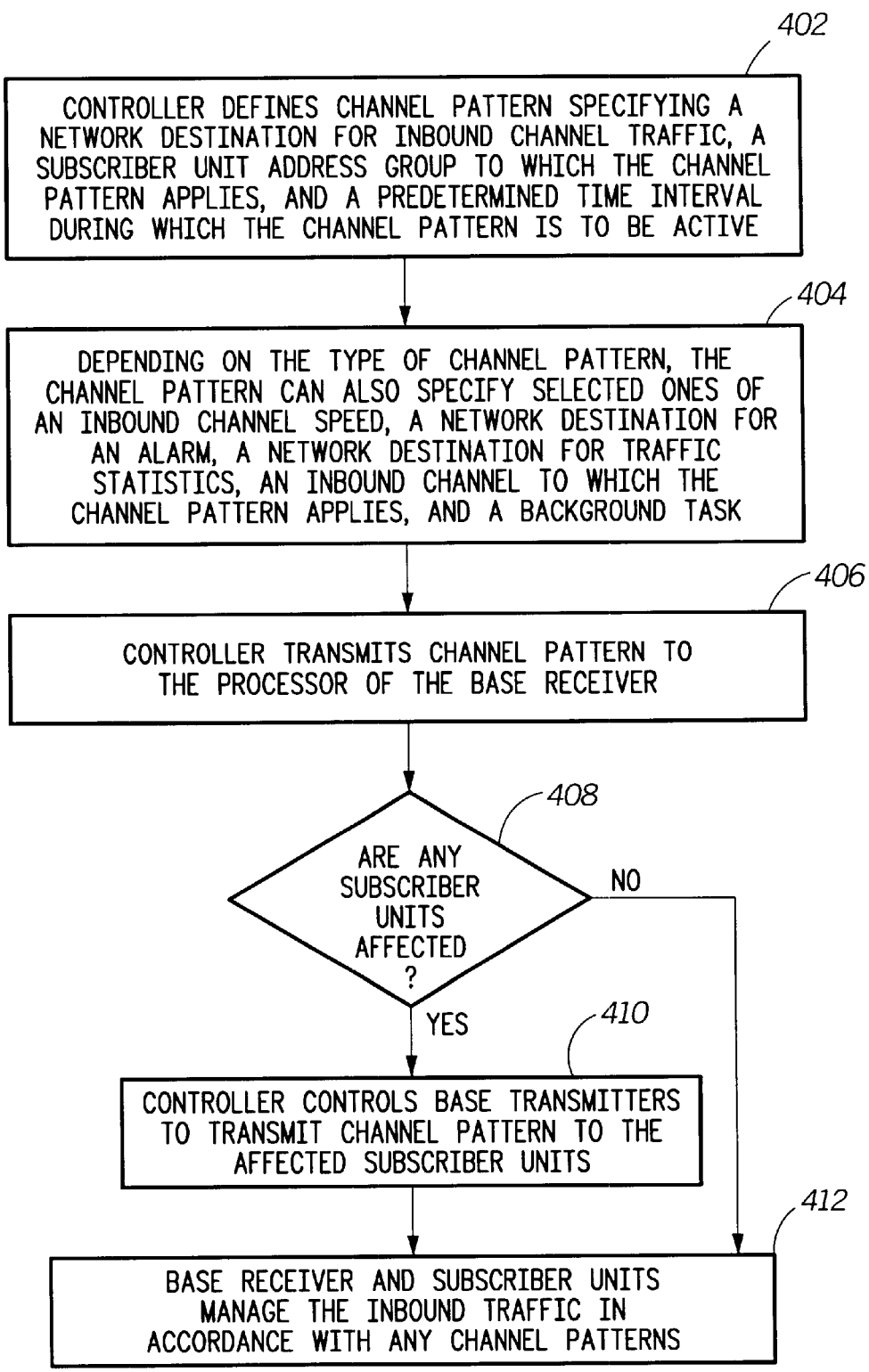
FIG. 4 is a flow diagram depicting operation of the wireless messaging system in accordance with the present invention.

FIG. 4 is a flow diagram 400 depicting operation of the wireless messaging system in accordance with the present invention. The flow begins at step 402, where the controller 112 preferably defines a channel pattern specifying a network destination for inbound channel traffic, a subscriber unit address group to which the channel pattern applies, and a predetermined time interval during which the channel pattern is to be active. In addition, depending on the type of channel pattern, the channel pattern can also specify 404 selected ones of an inbound channel speed, a network destination for an alarm, a network destination for traffic statistics, an inbound channel to which the channel pattern applies, and a background task, among other things. It will be appreciated that the term "subscriber unit address group" preferably can include any number of subscriber units, from none to every subscriber unit 122 in the wireless messaging system. The controller 112 then transmits 406 the channel pattern to the processor 310. The processing system 210 of the controller 112 then checks 408 whether any of the channel pattern is of a type that also affects the subscriber units 122. If so, the controller controls the base transmitters (not shown) of the base stations 116 to transmit 410 selected channel pattern information to the affected subscriber units 122. If not, step 410 is omitted. In either case, the base receiver 300 and the subscriber units 122 manage 412 the inbound traffic in accordance with any channel patterns received. It will be appreciated that, alternatively, in step 402 the controller 112 can specify a plurality of network destinations for the inbound channel traffic. A further alternative is for the controller 112 to specify for the inbound channel traffic a first network destination corresponding to a first type of data, and a second network destination corresponding to a second type of data. For example, the controller 112 can send different types of data (e.g., system monitoring data and billing data) to different IP addresses.

In somewhat greater detail, an exemplary technique for managing the channel pattern structure for the FLEX two-way communication protocol is described below. The inbound channel provides the raw over-the-air (OTA) data that is encapsulated by the Inbound Paging Protocol (IPP)

for transmission between the base receiver 300 and the controller 112. Managing changes to paging traffic requirements throughout the day defines how the IPP dynamic control works.

The FLEX protocol is divided into four-minute cycles, each containing 128 frames (0–127) of 1.875 seconds duration. The system operator can specify daily, hourly, cyclic, and frame patterns for IPP, statistics, and alarms. These "channel patterns" are intended to allow a specific one of multiple controllers to receive inbound data from a corresponding specific type of source. When the system operator chooses, for example, to lease inbound channel time and bandwidth, he may allow traffic accounting functions to be performed by the lessee. The channel patterns allow different Internet Protocol (IP) addresses to be specified during the dedicated leased times for IPP, statistical, and alarm type traffic. Operator "background tasks," statistics, and alarms can be sent to the operator's main controller. It makes sense for all base receiver performance alarms to be sent to the main controller so that field technicians who maintain the equipment are made aware of the alarms.

Each channel pattern type preferably begins at the start (top) of its type. For example, the daily patterns begin at midnight, hourly patterns begin at the top of the hour, cyclic patterns begin at frame 0, and frame patterns change after the last time slot of the last frame in the pattern and before the first frame boundary of the next frame pattern. The channel patterns preferably become active at the next identifiable marker of time. One complete pattern package may be active at any one time. If a complete channel pattern is not desired, a package portion "empty" (i.e., undefined) indicator shall be used for any area in the pattern that the system operator does not care to schedule. For example, if a daily pattern arrives at the base receiver at 4 PM, its contents will not be activated until midnight. If a pattern package arrives with its daily and hourly sections marked "empty", the cyclic pattern(s) will start with the next cycle boundary. Pattern indices are NOT related to FLEX two-way protocol indices such as frame or cycle numbers. Pattern indices are used to identify patterns. Each index has a one-to-one relationship with a pattern name. The first is used within the device as a pattern identifier, the second allows humans to give them names. If a base receiver demodulates multiple inbound channels, a different pattern package can apply to each channel.

What becomes dynamic, when all is said and done, is the number of FLEX two-way frames on the inbound channel that carry the same characteristics. The pattern package described below shows how days, broken down by hours, broken down by cycles, broken down by frame patterns, can change the density and use of inbound traffic. Within a single frame pattern, frames share channel speed, channel center frequency, IPP configuration, and IPP alarm and statistics IP destinations. If a system operator chooses to lease channel time and bandwidth consistently throughout the day, he can issue traffic pattern packages that contain, for example, up to 8 different frame patterns in any one 4 minute cycle. Frame patterns are the smallest configurable pieces of the pattern package; daily patterns are the largest. The pattern sections regulate greater and greater periods of time as they move up the hierarchical structure of the pattern package.

As an example, we'll describe a cycle that uses three frame patterns. Frames 0–20 will be at 800 bps, and IPP will be sent to a first controller at address IPP-1; alarms and statistics will both go to a third controller at IP-3. Frames 21–120 will be sent at 9600 bps, and IPP will be sent to a second controller at IPP-2. Alarms for these frames will go to IP-1 and statistics will go to a fourth controller at IP-4. Frames 121–127 will drop back down to 1600 bps; IPP will be sent to IPP-1; alarms and statistics will be sent to IP-3. These details are expressed below as part of the information contained in the frame patterns. The system operator can choose to ignore daily and hourly portions of the pattern package by designating them "empty". This scheme requires at least one cycle pattern that contains at least one frame pattern. With these two pieces in place, the traffic pattern can be replicated for every cycle in each hour of every day.

A pattern package shall state:
a pattern package index,
a pattern package name,
a channel ID assigned to the pattern, and
up to a predetermined number of daily pattern indices.

Each daily pattern index will specify: day of week, date, or range of days of week or dates denoting when the pattern will be active.

A single daily pattern may be used for one or more consecutive days. Having multiple daily patterns accommodates different days of the week. If the system operator should choose to lease out his equipment to several different service providers, he may choose to perform different maintenance and monitoring functions on different days for different clients.

A daily pattern shall state:
a daily pattern index,
a daily pattern name, and
up to a predetermined number of hourly pattern indices/day.

For each hourly pattern index, activation information will designate inclusive hour numbers (using a 24 hour clock) denoting when the pattern will be active during the day.

Hourly patterns allow gross changes in messaging applications and traffic densities throughout the day. For example, the first hourly pattern (H1) is consistent between midnight and 6 AM, H2 is consistent between 6 AM and 9 AM, H3 is consistent between 9 AM and 4 PM, H4 is consistent between 4 PM and 7 PM, and H5 is consistent between 7 PM and midnight.

An hourly pattern shall state:
an hour pattern index
an hour pattern name
up to a predetermined number of cyclic pattern indices/hour.

For each cyclic pattern index, activation information will designate inclusive cycle numbers (0–14) denoting when the pattern will be active during the hour.

An hour by definition contains 15 cycles. So having different cyclic patterns per hour allows sections of the hour to be used for field base station site monitoring, statistics collection, firmware upgrades, etc.

A cyclic pattern shall state:
a cyclic pattern index
a cyclic pattern name
up to a predetermined number of frame pattern indices/cycle.

For each frame pattern index, activation information will designate inclusive frame numbers (0–127) denoting when the pattern will be active during the cycle.

Frames within any frame pattern can operate at only one speed and have one configuration. The number of frames included in any pattern will be the number of frames that operate at the same speed.

A frame pattern shall state:
a frame pattern index.
a frame pattern name,
a channel center frequency,
an IPP destination,
IPP Configuration Bitmasks (includes channel speed),
an OTA traffic alarm IP destination,
an OTA traffic statistics IP destination,
a subscriber unit address group to which the pattern applies,
a background task type,
a background task name,
a background task alarm IP destination, and
a background task statistics IP destination.

It is preferred that the OTA inbound channel attributes that are configurable through IPP are communicated to the processor 310 of the base receiver 300. This information must be made available early enough before the beginning of each cycle so that the base receiver 300 has time to react to the channel configuration changes without losing inbound channel traffic. It will be appreciated that some of the items in the frame pattern can be marked inactive, when appropriate. For example, when a background task is not needed for the duration of a frame pattern, the four background task items can be marked inactive.

It should be clear from the preceding disclosure that the channel pattern techniques described herein above advantageously allow inbound traffic to be managed in a flexible and efficient manner, thereby enabling system sharing. In particular, the present invention advantageously provides facilities for supporting shared use of a wireless messaging system by multiple service providers.

Many modifications and variations of the present invention are possible in light of the above teachings. Thus, it is to be understood that, within the scope of the appended claims, the invention can be practiced other than as specifically described herein above.

What is claimed is:

1. A method in a two-way wireless messaging system for managing inbound traffic, the method comprising the steps of:
    defining a channel pattern specifying, for a repeating pattern of frames:
        a first network destination for inbound channel traffic for a first repeating frame,
        a second network destination for inbound channel traffic for a second repeating frame,
        a subscriber unit address group to which the channel pattern applies, and
        a predetermined time interval during which the channel pattern is to be active;
    transmitting the channel pattern from the two-way wireless messaging system to a processor located in an infrastructure portion of the system which processes received inbound traffic from the subscriber unit;
    receiving inbound traffic in a frame; and
    managing, by the processor, the inbound traffic in accordance with the channel pattern specification for a frame in which the traffic is received.

2. The method of claim 1, wherein the step of defining the channel pattern comprises the step of specifying an inbound channel speed.

3. The method of claim 1, wherein the step of defining the channel pattern comprises the step of specifying a network destination for an alarm.

4. The method of claim 1, wherein the step of defining the channel pattern comprises the step of specifying a network destination for traffic statistics.

5. The method of claim 1, wherein the step of defining the channel pattern comprises the step of specifying an inbound channel to which the channel pattern applies.

6. The method of claim 1, wherein the step of managing further comprises routing traffic to a network destination specified for the frame in which the traffic is received.

7. The method of claim 1, further comprising the step of
    transmitting the channel pattern from the controller of the two-way wireless messaging system to a subscriber unit.

8. The method of claim 1, wherein the step of defining the channel pattern comprises the step of specifying a plurality of network destinations for the inbound channel traffic.

9. The method of claim 1, wherein the step of defining the channel pattern comprises the step of specifying for the inbound channel traffic a first network destination corresponding to a first type of data, and a second network destination corresponding to a second type of data.

10. A controller in a two-way wireless messaging system for managing inbound traffic, the controller comprising:
    a network interface for receiving a message;
    a processing system coupled to the network interface for processing the message; and
    a base station interface coupled to the processing system for controlling and communicating with a base transmitter and a base receiver,
wherein the processing system is programmed to:
    define a channel pattern specifying, for a repeating pattern of frames:
        a first network destination for inbound channel traffic for a first repeating frame,
        a second network destination for inbound channel traffic for a second repeating frame,
        a subscriber unit address group to which the channel pattern applies, and
        a predetermined time interval during which the channel pattern is to be active; and
    transmit the channel pattern from the two-way wireless messaging system to a processor located in an infrastructure portion of the system which processes received inbound traffic from the subscriber unit;
    receive inbound traffic in a frame; and
    manage, by the processor, the inbound traffic in accordance with the channel pattern specification for a frame in which the traffic is received.

11. The controller of claim 10, wherein in defining the channel pattern the processing system is further programmed to specify an inbound channel speed.

12. The controller of claim 10, wherein in defining the channel pattern the processing system is further programmed to specify a network destination for an alarm.

13. The controller of claim 10, wherein in defining the channel pattern the processing system is further programmed to specify a network destination for traffic statistics.

14. The controller of claim 10, wherein in defining the channel pattern the processing system is further programmed to specify an inbound channel to which the channel pattern applies.

15. The controller of claim 10, wherein in managing the inbound traffic, the processing system is further programmed to route the traffic to a network destination specified for the frame in which the traffic is received.

16. The controller of claim 10, wherein the processing system is further programmed to control the base transmitter to transmit the channel pattern to a subscriber unit.

17. A base receiver in a two-way wireless messaging system for managing inbound traffic, the base receiver comprising:

a receiver element for receiving the inbound traffic;

a processor coupled to the receiver element for processing the inbound traffic;

a network interface coupled to the processor for communicating with a controller through a network, wherein the processor is programmed to:

receive through the network interface a channel pattern specifying, for a repeating pattern of frames:

a first network destination for inbound channel traffic for a first repeating frame, a second network destination for inbound channel traffic for a second repeating frame, a subscriber unit address group to which the channel pattern applies, and a predetermined time interval during which the channel pattern is to be active; and manage, by the processor, the inbound traffic in accordance with the channel pattern specification for a frame in which the traffic is received.

18. The base receiver according to claim 17, wherein in managing the inbound traffic, the processor is further programmed to route the traffic to a network destination specified for the frame in which the traffic is received.

* * * * *